United States Patent
Fellerer

(10) Patent No.: US 7,383,435 B2
(45) Date of Patent: Jun. 3, 2008

(54) METHOD FOR ENCODING AND DECODING COMMUNICATION DATA

(75) Inventor: Josef Fellerer, München (DE)

(73) Assignee: Siemens Aktiengesellschaft, Munich (DE)

(*) Notice: Subject to any disclaimer, the term of this patent is extended or adjusted under 35 U.S.C. 154(b) by 609 days.

(21) Appl. No.: 10/487,523

(22) PCT Filed: Aug. 1, 2002

(86) PCT No.: PCT/DE02/02837

§ 371 (c)(1),
(2), (4) Date: Feb. 18, 2004

(87) PCT Pub. No.: WO03/028285

PCT Pub. Date: Apr. 3, 2003

(65) Prior Publication Data

US 2004/0202323 A1    Oct. 14, 2004

(30) Foreign Application Priority Data

Aug. 30, 2001 (DE) ................................ 101 42 498

(51) Int. Cl.
*H04L 9/00* (2006.01)
*H04K 1/00* (2006.01)

(52) U.S. Cl. ...................... 713/160; 713/189; 380/274; 380/277

(58) Field of Classification Search ...................... None
See application file for complete search history.

(56) References Cited

U.S. PATENT DOCUMENTS

| | | | |
|---|---|---|---|
| 4,607,137 A | 8/1986 | Jansen et al. | |
| 4,903,262 A | 2/1990 | Dissosway et al. | |
| 5,185,796 A | 2/1993 | Wilson | |
| 5,355,413 A * | 10/1994 | Ohno | 713/159 |
| 5,479,514 A * | 12/1995 | Klonowski | 380/47 |
| 5,754,938 A * | 5/1998 | Herz et al. | 725/116 |
| 2002/0162006 A1* | 10/2002 | Takahashi et al. | 713/182 |
| 2003/0021418 A1* | 1/2003 | Arakawa et al. | 380/277 |
| 2003/0035542 A1* | 2/2003 | Kim | 380/270 |
| 2003/0208693 A1* | 11/2003 | Yoshida | 713/201 |
| 2004/0177257 A1* | 9/2004 | Fujinawa et al. | 713/189 |

(Continued)

FOREIGN PATENT DOCUMENTS

| | | |
|---|---|---|
| DE | 199 11 176 A1 | 9/2000 |
| EP | 1 035 684 A2 | 9/2000 |
| WO | WO 01/08348 A1 * | 2/2001 |
| WO | WO 01/54371 A2 | 7/2001 |

OTHER PUBLICATIONS

Daniel Stevenson, Nathan Hillery, and Greg Byrd; Secure Communications in ATM Networks; Communications of the ACM 38 (Feb. 1995), No. 2, New York, US, pp. 45-52.

Thomas McGovern; Varying Encryption Keys for a Single Call; Motorola Technical Developments 24 (Mar. 1995), Schaumburg, IL, US, pp. 61-62.

*Primary Examiner*—Christopher Revak

(57) ABSTRACT

The invention relates to a method for encoding and decoding communication data, especially voice data, which is transmitted in a plurality of data packets in a digital communication network, especially for internet telephony. The communication data is encoded by means of a selected code at an emission point in each of the data packets; a code number of the selected code is transmitted as code information with each of the data packets; and the communication data is decoded by allocating the code number to the code stored in the code table created at a reception point.

12 Claims, 2 Drawing Sheets

U.S. PATENT DOCUMENTS

| | | | |
|---|---|---|---|
| 2004/0193878 A1* | 9/2004 | Dillinger et al. | 713/165 |
| 2004/0202323 A1* | 10/2004 | Fellerer | 380/44 |
| 2004/0247125 A1* | 12/2004 | McClellan | 380/262 |
| 2006/0126827 A1* | 6/2006 | Milleville | 380/28 |
| 2007/0242829 A1* | 10/2007 | Pedlow, Jr. | 380/277 |
| 2007/0258586 A1* | 11/2007 | Huang et al. | 380/201 |

* cited by examiner

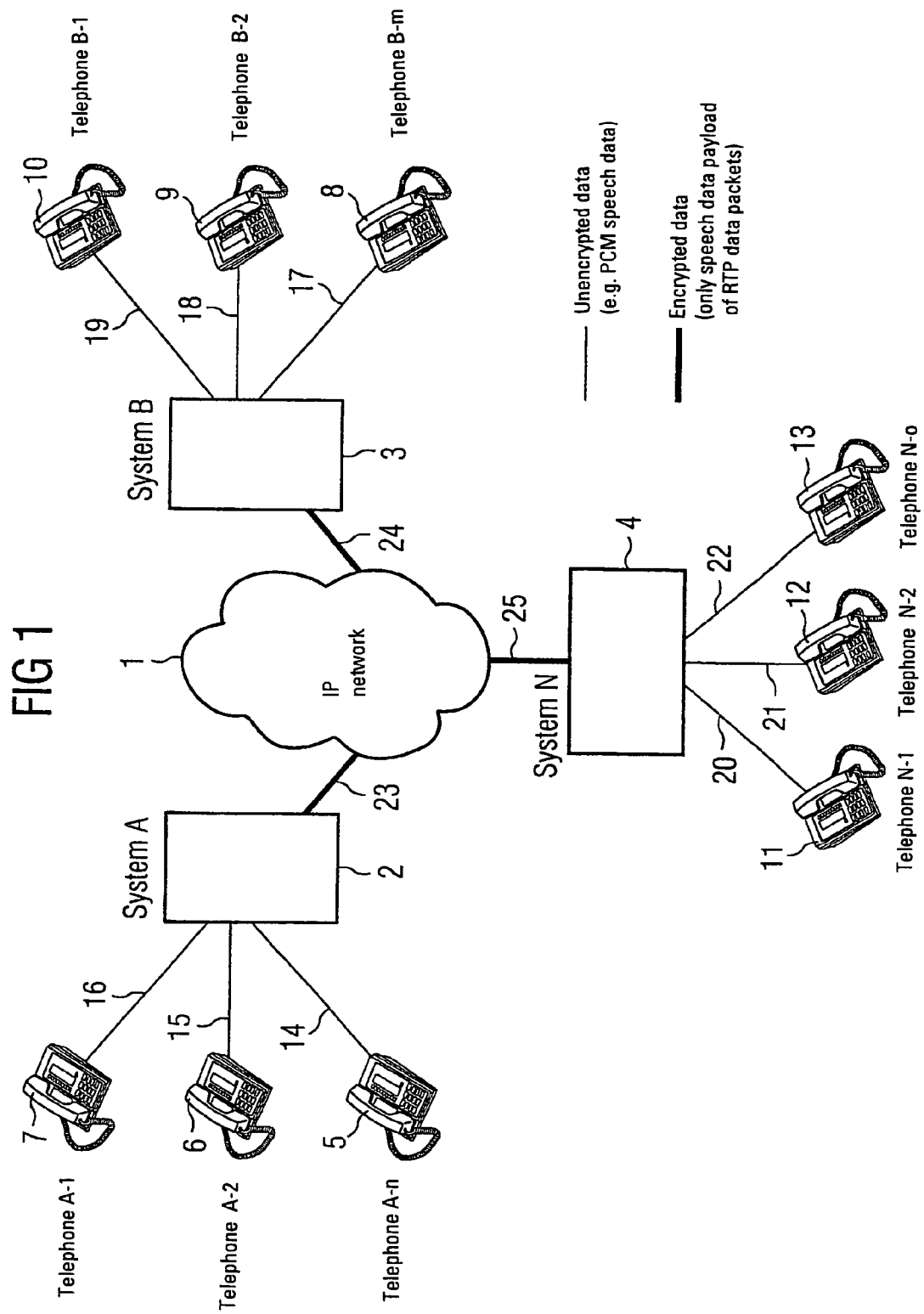

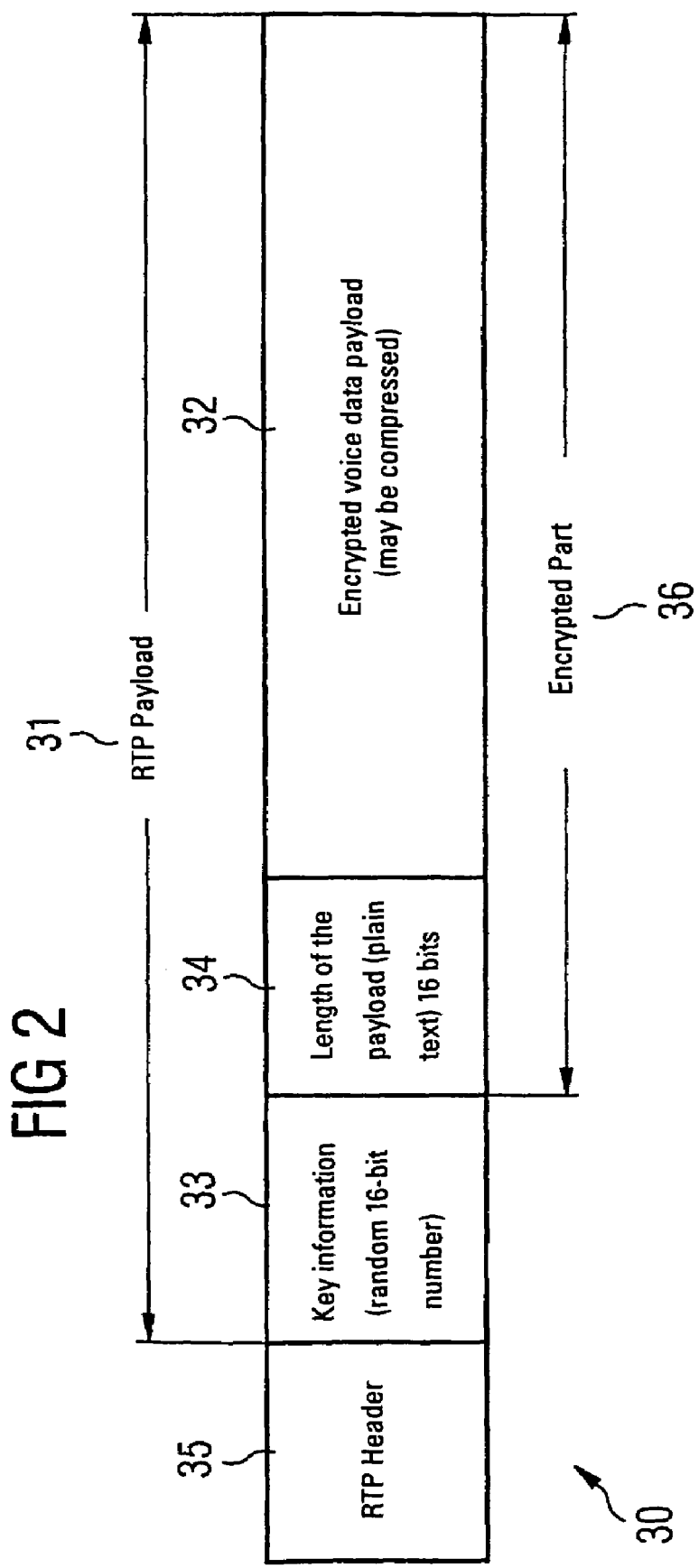

METHOD FOR ENCODING AND DECODING COMMUNICATION DATA

CROSS REFERENCE TO RELATED APPLICATIONS

This application is the U.S. National Stage of International Application No. PCT/DE02/02837, filed Aug. 1, 2002 and claims the benefit thereof. The International Application claims the benefits of German application No. 10142498.1 filed Aug. 30, 2001, both of the applications are incorporated by reference herein in their entirety.

FIELD OF INVENTION

The invention relates to a method for encryption and decryption of communication data according to the preamble of patent claim 1. Methods for encryption and decryption of communication data are frequently employed with data transmission via public networks, such as a network based on the ISDN standard or the Internet, as a protective measure against unauthorized eavesdropping on the transmitted data. These types of encryption procedures are based as a rule on the use of additional hardware components which perform an encryption and decryption of the communication data.

BACKGROUND OF INVENTION

As an alternative to the hardware components or in combination with these components software for encryption or decryption of the data can be used, however this requires powerful computers for the encryption systems.

To make it possible for the hardware components to encrypt or decrypt the data it is necessary for the data to be transmitted or transmitted back to the hardware components. This requires additional time for the encryption process before the encrypted data can be transmitted from a send location to a receive location or can be read at a receive location.

Since with Internet telephony (Voice-over-IP) small data packets are used for transmission of the speech data, and the data packets, because of their connectionless transmission, are able to choose different paths to the receive locations in order to be reassembled there into a complete sequence of packets again, fast decryption of the data assigned to the individual data packets must be possible to avoid further processing times, in order to retain a good speech quality during the telephone call.

To make faster transmission of the data possible, the User Datagram Protocol (UDP), which, unlike TCP, dispenses with error detection and correction, is used as the transmission protocol for Internet telephony. Data packets that are transferred with the UDP generally have a smaller header containing various administration or control data. This type of administration data also includes error detection and correction data which in this case can be left out. The error detection and correction data is then frequently supported by a protocol from a higher layer, such as for the Real Time Protocol (RTP) for example. Provided the header is small, a relatively small overhead can be realized. This in its turn leads to faster processing of the payload data transmitted with the data packets. Because UDP is used as the transport protocol, loss-free transmission of the speech data is not guaranteed in Internet telephony because of the lack of error correction. The best method is therefore the independent encryption, transmission and decryption of individual data packets which are as small as possible. To date the encryption methods have been based on an exchange of the key with which the payload data contained in the data packets was encrypted. A key of this type can be transmitted before the payload data from the send location to the receive location. The additional exchange method and the associated creation of a key require additional computing and transmission time which means that the transfer of communication data takes longer. Furthermore, with the encryption methods known to date, there may well be license fees to be paid for using these methods. The computing times increase with the encryption systems which aim to simultaneously encode the data of a number of connections running in parallel.

SUMMARY OF INVENTION

As a result, the object of the present invention is to develop a generic method for encryption and decryption of communication data in such a way as to make faster and lower-cost encryption and decryption of the data possible. This object is achieved in accordance with the features of patent claim 1.

A significant point of the invention lies in the fact that it is not necessary—as previously—to use an exchange process for the key with which the payload data is encrypted between send and receive location but instead a key number is transmitted as key information with the communication data within a data packet. This type of key number allows a small header within the data packet and thus a short transmission and processing time for the data packets.

The key number is arranged for example as the index of number of keys arranged within a key table and, after receipt of the data packet and evaluation of the header data, allows fast access to the correct key that is then used for decryption of the communication data.

In accordance with a preferred embodiment, the key number will be selected at the send location by means of a random generator, so that an external observer would not be able to predict which key will be used to transmit the data packets. Since for each data packet a new key number is selected at random with the generator, the decryption of the payload data by an unauthorized observer after the assembly of a number of data packets is practically impossible.

In particular the fact it is not possible to easily detect a random correct decryption of a packet makes eavesdropping more difficult.

Key tables with identical content are used at both the send location and the receive location. The key tables are for example composed of 4096 keys with the associated key numbers. Therefore, to decrypt the communication data it is not only necessary to know a large number of keys but also to know the assignment of the keys to a key number in each case.

The algorithm representing the key can be based on the Data Encryption Standard (DES) and/or the Advanced Encryption Standard (AES) which allows simultaneous encryption and compression of the communication data. The speech data is quickly encrypted and compressed especially when the method in accordance with the invention is used in Internet telephony.

Advantageously the data packet can additionally contain size information about the extent of the payload data to allow filler bytes which are generated as part of a block-type encryption method to be recognized as such and separated from the user data.

BRIEF DESCRIPTION OF THE DRAWINGS

Further advantageous embodiments emerge from the subclaims. Additional suitable uses and advantages are listed in the description below in conjunction with the drawing. The drawing shows:

FIG. 1 a simplified diagram of equipment used for execution in accordance with the inventive method, and FIG. 2 The structure of a data packet with an encryption of the data in accordance with the inventive method.

DETAILED DESCRIPTION OF INVENTION

FIG. 1 shows a greatly simplified diagram of devices which are used for executing the method in accordance with the invention. To make an Internet telephone call a public IP network 1 links a number of encryption or decryption systems 2, 3 and 4, which are connected to a number of telephones 5-7, 8-10 and 11-13. Between the telephones 5-13 and the systems 2, 3 and 4 there are connections 14-16, 17-19 which transmit speech data from the telephones to the systems in unencrypted form. The connections 23, 24 and 25 arranged between the IP network 1 and the systems 2, 3 and 4 on the other hand are used for transmission of encrypted speech data within the framework of an RTP data packet.

When a user of telephone 7 wants to speak via the IP network with a user of telephone 8, speech data is transmitted via line 16 to the system 2. In system 2 a key number is selected by means of a random generator as a random number for each data packet in which the speech data will be transmitted and assigned to the relevant data packet as key information and transmitted together with the speech data via IP network 1. In a key table assigned to system 2 the key belonging to the key number is extracted and employed as an algorithm, based on DES for example, for encryption of the speech data.

The encrypted speech data is sent as payload data in the form of an RTP payload together with the key number for each data packet separately via the IP network 1 to the system 3. There the key number is extracted from each data packet and assigned as an index in a key table arranged in system 3 which is identical to the key table arranged in system 2. In the key table there is access to the key assigned to the index, so that it can be used for decrypting the speech data. The encrypted speech data of the individual data packets is combined to form a common data record so that contiguous, easily understandable records can be transmitted over line 17 to telephone 8.

FIG. 2 shows the structure of a data packet in which speech data is encrypted according to the inventive method. The structure of data packet 30 comprises the volumes of payload data 31 (RTP Payload), the encrypted payload data 32, the key information 33, the size information 34 about the extent of the encrypted payload data and the RTP header data 35. The payload data volume proportion 31 includes a proportion 36 of encrypted data and the key information 33. The key information is 16 bits in length, of which the 12 lower-order bits form the key number. The 12 bits can be combined with one another in 4,096 different ways so that 4,096 different keys can be selected from the key table by means of the key number. When each of these keys comprises 64 bits a key table with a storage capacity of 32 kilobytes is required.

The four higher-order bits can preferably contain encryption information about the encryption algorithm used.

To determine the index in the key table of the receive location from the 16-bit integer number of the key information, the 4 higher-order bits of the key information are set to 0 and the index is determined from the remaining 12 lower-order bits of the index. The index will then be used to extract from within the key table a key assigned to the index, as a rule 8 bytes in length, and use it to decrypt or encrypt the speech data. For this the key can also undergo a generation procedure only at the moment of access, whereby it is selected via a random generator from a number of keys.

All systems 2, 3 and 4 feature key tables with identical contents within an overall system. Further overall systems can in their turn use other key tables which apply exclusively in their system.

It should be pointed out here that all parts and steps described above will be claimed as essential to the invention in their own right and in any combination, especially the details shown in the drawings. Amendments of this are familiar to the expert.

The invention claimed is:

1. A method for encrypting and decrypting communication data, transmitted in a plurality of data packets in a digital communication network comprising:
   encrypting the communication data in each of the plurality of data packets with a plurality of keys from a key table at a send location, wherein each individual data packet is encrypted with a selected key from the plurality of keys;
   defining a key number for each selected key, wherein each defined key number comprises a random number assigned to each individual packet;
   transmitting each key number of each selected key with each of the data packets as key information; and
   decrypting the encrypted communication data in each of the plurality of data packet by assignment of each transmitted key number for each individual packet to a corresponding key stored in a key table set up at a receive location.

2. A method according to claim 1, wherein there is access to key tables with identical content at the send location and the receive location.

3. A method according to claim 2, wherein size information about the extent of the communication data is transmitted with one of the data packets.

4. A method according to claim 2, wherein the key is an algorithm in accordance with the Data Encryption Standard and/or in accordance with the Advanced Encryption Standard.

5. A method according to claim 1, wherein size information about the extent of the communication data is transmitted with one of the data packets.

6. A method according to claim 1, wherein the key is an algorithm in accordance with the Data Encryption Standard and/or in accordance with the Advanced Encryption Standard.

7. A method according to claim 1, wherein the communication data is transmitted as payload data by the User Datagram Protocol transport protocol and additional data is transmitted by the Real Time Protocol in a header assigned to each of the data packets.

8. A method according to claim 7, wherein the additional data is the type of payload data and/or the time at which the payload data was created.

9. A method according to claim 1, wherein the communication data is encrypted and decrypted within a telecommunication system connected to a plurality of terminals.

10. A method in accordance with claim 1, wherein Encryption information about an encryption algorithm used is transmitted in a data packet.

11. A method according to claim 1, wherein the communication data is speech data.

12. A method according to claim 1, wherein the communication data is Internet telephony.

* * * * *